US008849558B2

(12) United States Patent
Morotomi et al.

(10) Patent No.: US 8,849,558 B2
(45) Date of Patent: Sep. 30, 2014

(54) COLLISION POSITION PREDICTING DEVICE

(75) Inventors: Kohei Morotomi, Susono (JP); Masayuki Katoh, Gotenba (JP); Hideaki Hayashi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/547,117

(22) Filed: Jul. 12, 2012

(65) Prior Publication Data

US 2013/0013184 A1 Jan. 10, 2013

Related U.S. Application Data

(63) Continuation of application No. PCT/JP2010/050229, filed on Jan. 12, 2010.

(51) Int. Cl.
*G06F 17/10* (2006.01)

(52) U.S. Cl.
USPC .......... 701/301

(58) Field of Classification Search
USPC .......... 701/301
See application file for complete search history.

(56) References Cited

U.S. PATENT DOCUMENTS

| | | | | |
|---|---|---|---|---|
| 6,035,053 | A | 3/2000 | Yoshioka et al. | |
| 2001/0020217 | A1 * | 9/2001 | Matsuno | 701/301 |
| 2008/0243389 | A1 * | 10/2008 | Inoue et al. | 701/301 |
| 2010/0001880 | A1 * | 1/2010 | Kraft et al. | 340/905 |
| 2010/0030474 | A1 * | 2/2010 | Sawada | 701/301 |
| 2010/0073194 | A1 * | 3/2010 | Ghazarian | 340/901 |
| 2010/0094502 | A1 | 4/2010 | Ito et al. | |
| 2010/0199283 | A1 * | 8/2010 | Kido et al. | 718/103 |
| 2010/0201509 | A1 * | 8/2010 | Hara et al. | 340/435 |
| 2010/0305858 | A1 * | 12/2010 | Richardson | 701/301 |
| 2011/0071731 | A1 * | 3/2011 | Eidehall et al. | 701/42 |
| 2011/0163904 | A1 * | 7/2011 | Alland et al. | 342/1 |
| 2011/0169626 | A1 * | 7/2011 | Sun et al. | 340/439 |

FOREIGN PATENT DOCUMENTS

| | | |
|---|---|---|
| JP | 6-215300 | 8/1994 |
| JP | H10-105891 | 4/1998 |
| JP | H11-115660 | 4/1999 |
| JP | 2000-247207 | 9/2000 |
| JP | 2000-251200 | 9/2000 |

(Continued)

OTHER PUBLICATIONS

Office Action on Dec. 3, 2013 in Japanese Patent Application No. 2011-549800.

*Primary Examiner* — Hussein A. Elchanti
(74) *Attorney, Agent, or Firm* — Oblon, Spivak, McClelland, Maier & Neustadt, L.L.P.

(57) ABSTRACT

The present invention is intended to provide a technique which is capable of detecting a collision position of a moving object crossing a road and a subject vehicle with a higher degree of accuracy. In the present invention, in cases where the moving object crossing the road into which the subject vehicle has entered is detected at the time when the subject vehicle has turned to the right or to the left, the direction of a moving vector of the moving object is fixed to a direction which is set based on a shape of the road into which the subject vehicle has turned to the right or to the left. Then, the collision position of the moving object and the subject vehicle is predicted based on this moving vector of which the direction is fixed.

2 Claims, 8 Drawing Sheets

(56) References Cited

FOREIGN PATENT DOCUMENTS

| | | | |
|---|---|---|---|
| JP | 2002-075494 | A | 3/2002 |
| JP | 2002-260192 | | 9/2002 |
| JP | 2004-178610 | A | 6/2004 |
| JP | 2006-309445 | A | 11/2006 |
| JP | 2007-001405 | | 1/2007 |
| JP | 2008-65482 | A | 3/2008 |
| JP | 2008-197720 | A | 8/2008 |
| JP | 2009-295184 | | 12/2009 |
| WO | 2008/038369 | A1 | 4/2008 |

* cited by examiner

COLLISION POSITION PREDICTING DEVICE

This application is a continuation of PCT international application No. PCT/JP2010/050229 filed on 12 Jan. 2010 and claims priority of it, the entire contents of which are expressly incorporated by reference herein.

TECHNICAL FIELD

The present invention relates to a collision position predicting device which serves to predict a collision position at which a moving object and an own or subject vehicle collide with each other.

BACKGROUND ART

In the past, in order to carry out driving support so as to avoid a collision between a moving object such as a pedestrian, bicycle, etc., crossing a road, and an own or subject vehicle, there has been developed a collision position predicting device which serves to predict the position of a collision between the moving object and the subject vehicle.

In Patent Document 1, there is disclosed a technique in which an intersection vector of an intersection at which a subject vehicle turns to the right or to the left is set from map data, and a moving direction vector of a pedestrian is set from pedestrian information, whereby the position of a collision between the subject vehicle and the pedestrian is predicted from both of the vectors. Moreover, in Patent Document 1, there are disclosed a technique in which the moving method vector of the pedestrian is set by the use of position information transmitted from the pedestrian, and a technique in which in cases where the moving direction of the pedestrian detected from the pedestrian's position information has been the same direction a plurality of times in a continuous manner, the moving direction vector is set to that moving direction.

In Patent Document 2, there is disclosed a technique in which in cases where the direction of the relative movement of a pedestrian has a component of movement to an orthogonal direction with respect to the direction of movement of a subject vehicle, a warning is generated by a warning unit. In Patent Document 3, there is disclosed a technique in which when the distance between a moving object and a pedestrian crossing is equal to or less than a predetermined value, a determination is made that the moving object crosses the pedestrian crossing.

PRIOR ART DOCUMENTS

Patent Documents

Patent Document 1: Japanese patent application laid-open No. 2008-065482

Patent Document 2: Japanese patent application laid-open No. 2008-197720

Patent Document 3: Japanese patent application laid-open No. 2004-178610

SUMMARY OF THE INVENTION

Problems to be Solved by the Invention

In cases where the position of a collision between a moving object crossing a road and a subject vehicle is predicted, it is necessary to obtain a moving vector of the moving object. However, in cases where the moving vector of the moving object is calculated based on the position information on the moving object, there will be a fear that the following problems may occur.

FIG. 8 shows a case where moving vectors of a moving object are calculated based on a plurality of pieces of position information which have been detected at a predetermined interval of time. The moving object crossing a road does not always go in a fixed direction, but may move in a staggering or fluctuating manner. In this case, when the moving vectors of the moving object are calculated by connecting the current position information with the last position information in a successive manner, variation will occur in the direction of individual moving vectors, as shown in FIG. 8. As a result, it is difficult to predict the collision position of the moving object and the subject vehicle with a high degree of accuracy based on such a plurality of moving vectors which have variation in their direction.

In addition, for example, in cases where a vector with a different direction has been calculated at one time when a vector with a fixed direction has been calculated a plurality of times in a continuous manner as the moving vector of the moving object, it is possible to obtain the moving vector with the fixed direction by carrying out the processing of excluding the vector with the different direction. However, in cases where the direction of the moving vector changes in a frequent manner, as shown in FIG. 8, it is also difficult to apply such processing.

Moreover, FIG. 9 shows a case where position information on a moving object (pedestrian in FIG. 9) crossing a road is detected by means of a sensor such as a millimeter wave radar, a stereoscopic camera, etc., so that a moving vector of the moving object is calculated based on the position information thus detected. In cases where the position information on the moving object is detected by such a sensor, as shown in FIG. 9, position information on different positions on the same moving object may be detected as the position information of the moving object. In cases where a moving vector of the moving object is calculated based on the position information detected in this manner, there will be a fear that an error may occur between the thus calculated direction of the moving vector, and the actual direction of the moving vector. Further, there will also be a fear that an error may occur in position information due to the characteristics of the sensor. In cases where these errors occur, too, it is difficult to predict the collision position of the moving object and the subject vehicle with a high degree of accuracy based on the moving vector thus calculated.

The present invention has been made in view of the above-mentioned problems, and has for its object to provide a technique which is capable of detecting the position of a collision between a moving object crossing a road and an own or subject vehicle with a higher degree of accuracy.

Means for Solving the Problems

The present invention resides in that in cases where a moving object crossing a road into which a subject vehicle has entered is detected at the time when the subject vehicle has turned to the right or to the left, the direction of a moving vector of the moving object is fixed to a direction which is set based on a shape of the road into which the subject vehicle has turned to the right or to the left, and the position of a collision between the moving object and the subject vehicle is predicted based on the moving vector of which the direction is fixed.

More specifically, a collision position predicting device according to the present invention is characterized by comprising:

moving object detection unit to detect a moving object on a road; and collision position predicting unit to predict, upon detection of the moving object crossing the road by the moving object detection unit, a collision position of the moving object and a subject vehicle based on a moving vector of the moving object;

wherein in cases where the moving object crossing the road into which the subject vehicle has entered is detected at the time when the subject vehicle has turned to the right or to the left, the direction of the moving vector of the moving object to be used for the prediction of the collision position by said collision position predicting unit is set based on a shape of the road into which the subject vehicle has turned to the right or to the left.

According to the present invention, even if the moving object is moving in a staggering or fluctuating manner at the time of predicting the collision position of the moving object and the subject vehicle, the direction of the moving vector thereof is fixed in a fixed direction. Accordingly, it is possible to detect the collision position of the moving object crossing the road and the subject vehicle with a higher degree of accuracy.

In the present invention, in cases where the moving object crossing the road into which the subject vehicle has entered is detected at the time when the subject vehicle has turned to the right or to the left, the direction of the moving vector of the moving object to be used for the prediction of the collision position by the collision position predicting unit may be set to a direction vertical to the road into which the subject vehicle has entered.

Even though the moving object crossing the road is moving in a staggering or fluctuating manner, there is a high possibility that the moving object is basically going or advancing in a direction vertical to the road. For that reason, by setting the direction vertical to the road as the direction of the moving vector of the moving object, it is possible to detect the collision position of the moving object crossing the road and the subject vehicle with a higher degree of accuracy.

In this case, the moving vector calculated from the position information on the moving object may be decomposed or divided into a road direction component in the direction of the road into which the subject vehicle has entered, and a vertical direction component which is vertical or orthogonal to that road, and the vertical direction component may be used as the moving vector of the moving object which is used for the prediction of the collision position by the collision position predicting unit.

In addition, in cases where a pedestrian crossing is formed or located on the road into which the subject vehicle has turned to the right or to the left to enter, and the moving object crossing the road detected by the moving object detection unit exists on the pedestrian crossing, there is a high possibility that the moving object is going or advancing in the direction of the pedestrian crossing. Accordingly, in this case, the direction of the moving vector of the moving object to be used for the prediction of the collision position of the moving object and the subject vehicle by the collision position predicting unit may be set to the direction of the pedestrian crossing in preference to the shape of the road. According to this, it is possible to detect the collision position of the moving object crossing the road and the subject vehicle with a higher degree of accuracy.

In above case, the moving vector calculated from the position information on the moving object may be decomposed or divided into a pedestrian crossing direction component and a vertical direction component which is vertical or orthogonal to the pedestrian crossing, and the pedestrian crossing direction component may be used as the moving vector of the moving object which is used for the prediction of the collision position by the collision position predicting unit.

ADVANTAGEOUS EFFECT OF THE INVENTION

According to the present invention, it is possible to predict the position of a collision between a moving object crossing a road and an own or subject vehicle with a higher degree of accuracy.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

<First Embodiment>

Reference will be made to a first embodiment of a collision position predicting device according to the present invention, based on FIGS. 1 through 4.

(Schematic Construction)

Figure 1:
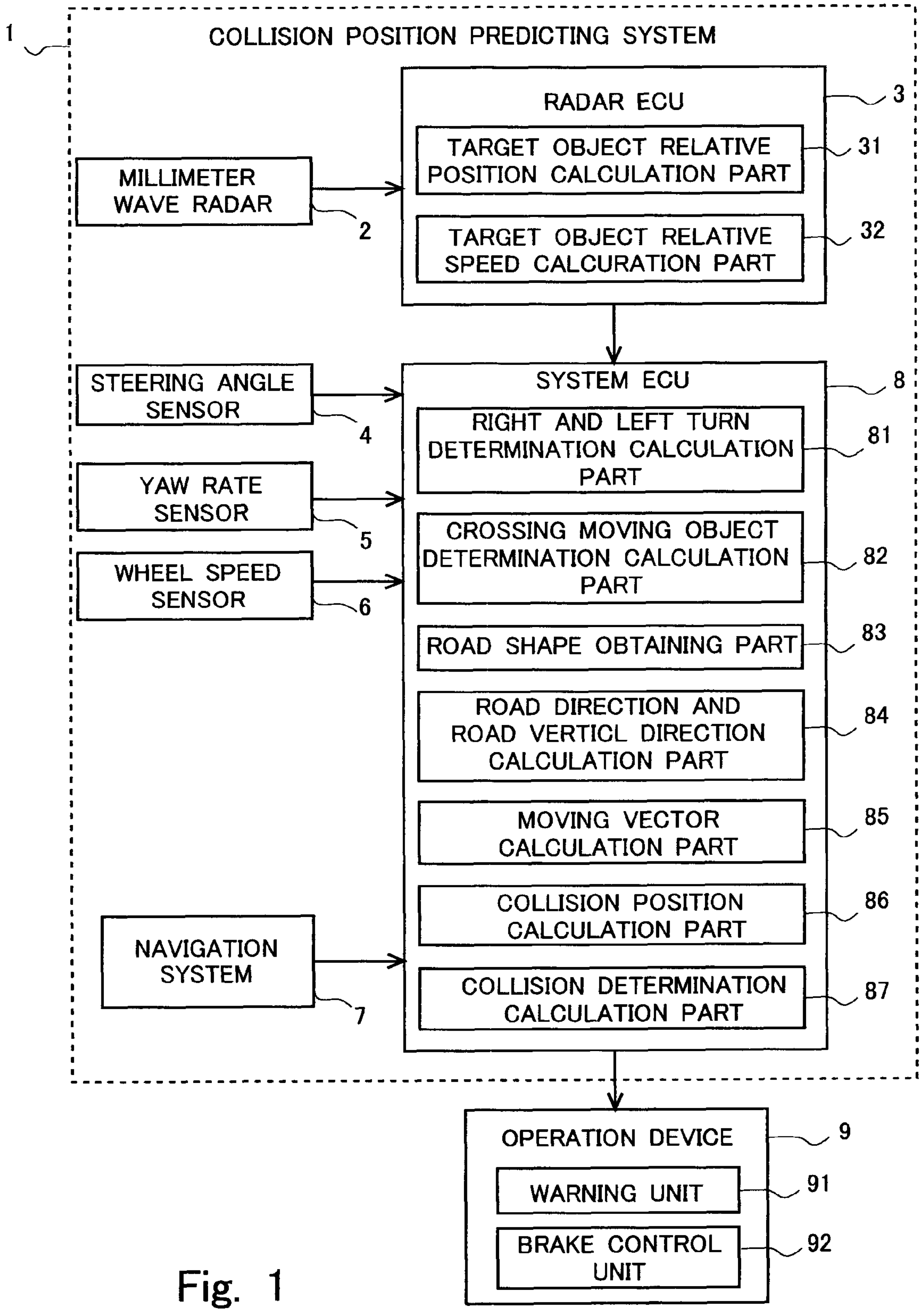
FIG. 1 This is a block diagram showing the overall construction of a collision position predicting system according to a first embodiment of the present invention.

FIG. 1 is a block diagram showing the overall construction of a collision position predicting system according to this first embodiment of the present invention. The collision position predicting system 1 is mounted on a vehicle which runs on a road. The collision position predicting system 1 is a device which serves to predict the position of a collision between a target object existing on the road and an own or subject vehicle, and to carryout a warning to the driver of the vehicle and collision avoidance control when there is a possibility of a collision between the target object and the subject vehicle. The collision position predicting system 1 is provided with a millimeter wave radar 2, a radar ECU 3, a steering angle sensor 4, a yaw rate sensor 5, a wheel speed sensor 6, a navigation system 7, and a system ECU 8.

The millimeter wave radar 2 is arranged at the front side of the subject vehicle, and serves to detect the direction and distance from the subject vehicle of each target object existing ahead of the subject vehicle. The millimeter wave radar 2 scans millimeter waves within a predetermined range ahead of the subject vehicle, receives reflected waves from target objects, and detects the distance to each target object in each direction in which the reflected waves are detected. Such detection by the millimeter wave radar 2 is carried out at each predetermined period of time. The millimeter wave radar 2 outputs a signal corresponding to the direction and distance thus detected to the radar ECU 3 in a successive manner.

The radar ECU 3 calculates the position with respect to the subject vehicle of the target object existing ahead of the subject vehicle. The radar ECU 3 is composed, as a main component, of a computer including a CPU, a ROM, a RAM, and so on. The radar ECU 3 is provided with a target object relative position calculation part 31 and a target object relative speed calculation part 32.

The target object relative position calculation part 31 calculates, based on the signal inputted thereto from the millimeter wave radar 2, the position (relative position) with respect to the subject vehicle of each target object detected by the millimeter wave radar 2. This relative position is calculated as a distance and a lateral position thereof. Here, the distance and the lateral position are a component in a fore and aft or longitudinal direction of the subject vehicle and a component in a lateral or transverse direction of the subject vehicle, respectively, into which a rectilinear distance between a target object and the subject vehicle is divided, wherein the component in the longitudinal direction is assumed to be "the distance", and the component in the lateral or transverse direction is assumed to be "the lateral position". The target object relative position calculation part 31 outputs a signal corresponding to the result of the calculation to the system ECU 8.

The target object relative speed calculation part 32 calculates the speed (relative speed) with respect to the subject vehicle of the target object detected by the millimeter wave radar 2. The target object relative speed calculation part outputs a signal corresponding to the result of this calculation to the system ECU 8.

The steering angle sensor 4 is mounted on a steering shaft of the subject vehicle, and serves to detect the steering angle of the steering shaft of the subject vehicle. The steering angle sensor 4 is provided with a rotary encoder, etc., and serves to detect the direction and the magnitude of the steering angle which has been inputted by the driver of the subject vehicle. In addition, the steering angle sensor 4 outputs a steering angle signal corresponding to the direction and the magnitude of the steering angle thus detected to the system ECU 8.

The yaw rate sensor 5 is arranged in a central portion of the vehicle body of the subject vehicle, and serves to detect the yaw rate of the subject vehicle. In addition, the yaw rate sensor 5 outputs a signal corresponding to the yaw rate thus detected to the system ECU 8.

The wheel speed sensor 6 is provided for each of the wheels of the subject vehicle, and serves to detect wheel speed pulses. In addition, the wheel speed sensor 6 outputs a wheel speed pulse signal corresponding to the wheel speed pulses thus detected to the system ECU 8.

The navigation system 7 is a device which serves to calculate the current position of the subject vehicle by receiving signals from artificial satellites. Road (route) information (road map) is stored in advance in the navigation system 7. And, the navigation system 7 calculates the current position of the subject vehicle on the route information. In addition, the navigation system 7 outputs a signal corresponding to the result of this calculation to the system ECU 8.

The system ECU 8 serves to predict the collision position of the target object detected by the millimeter wave radar 2 and the subject vehicle, and to determine whether there is a possibility of a collision between the target object and the subject vehicle. The system ECU 8 is composed, as a main component, of a computer which includes a CPU, a ROM, a RAM, and so on. The system ECU 8 predicts the collision position by carrying out predetermined processing based on signals inputted from the radar ECU 3, the steering angle sensor 4, the yaw rate sensor 5, the wheel speed sensor 6, and the navigation system 7. The system ECU 8 is provided with a right and left turn determination calculation part 81, a crossing moving object determination calculation part 82, a road shape obtaining part 83, a road direction and road vertical direction calculation part 84, a the moving vector calculation part 85, a collision position calculation part 86, and a collision determination calculation part 87. The details of each part will be described later.

In cases where a determination is made by the system ECU 8 that the target object and the subject vehicle can collide with each other, an ON signal is transmitted from the system ECU 8 to an operation device 9. The operation device 9 includes a warning unit 91 and a brake control unit 92. Upon reception of the ON signal, the warning unit 91 carries out a warning to the driver by means of displaying it on a monitor, sounding, etc. Also, upon reception of the ON signal, the brake operating unit 92 operates a brake of the subject vehicle in an automatic manner. Here, note that other devices, such as an automatic steering apparatus, etc., to perform collision avoidance control may be included in the operation device 9. Moreover, a device to carry out collision damage reduction control, such as a seat belt control device, a seat position control device, an air bag control device, and so on, may be included in the operation device 9.

(Collision Position Predicting Method)

Figure 2:
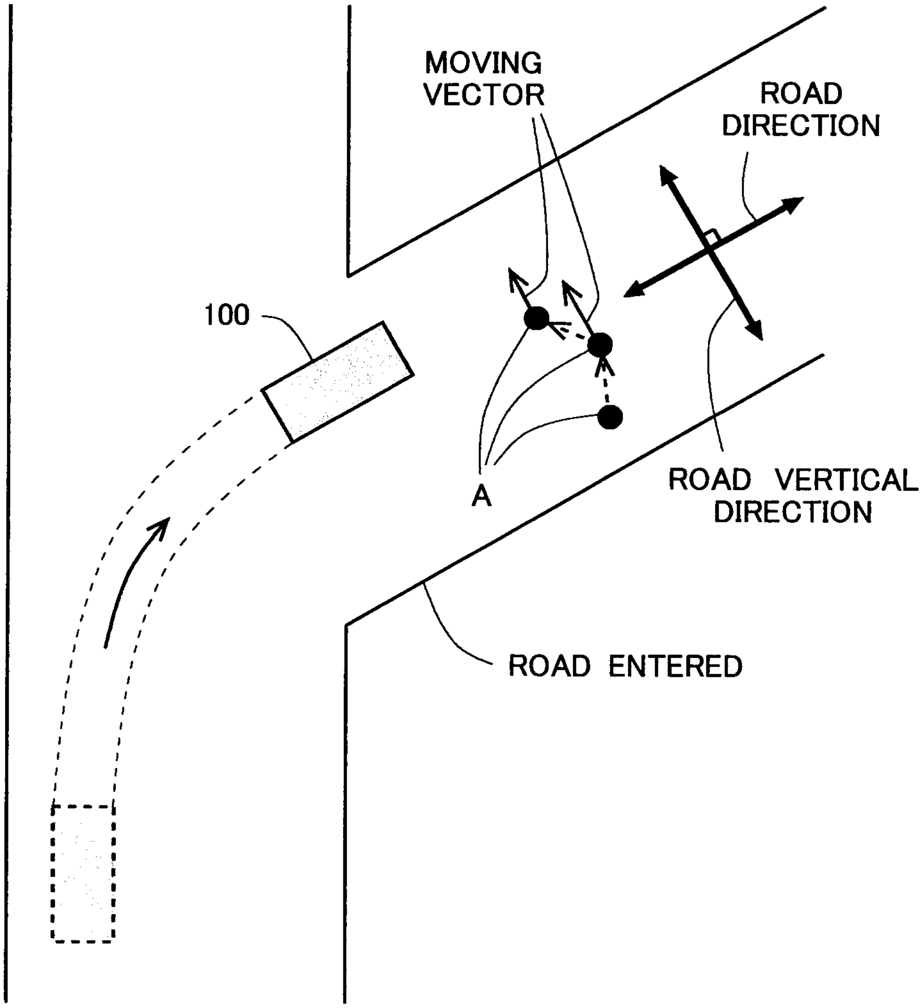
FIG. 2 This is a view showing a state in which a crossing moving object is detected on a road into which a subject vehicle has entered at the time of having turned to the right, according to the first embodiment.

Next, in this embodiment, reference will be made to a method, based on FIGS. 2 and 3, in which when a moving object crossing a road into which the subject vehicle has entered (hereinafter, also referred to as a crossing moving object) is detected by the millimeter wave radar 2 at the time of the subject vehicle being turned to the right or to the left, the position of a collision between the crossing moving object and the subject vehicle is predicted. FIG. 2 shows a situation when a crossing moving object A is detected on a road into which the subject vehicle 100 has entered at the time of having turned to the right. In FIG. 2, all crossing moving objects A as illustrated in plurality are the same moving object, and individual points represent the positions of the crossing moving object A detected at a predetermined interval of time by the millimeter wave radar 2.

In this embodiment, the collision position of the crossing moving object and the subject vehicle is predicted based on the moving vector of the crossing moving object, the speed of the subject vehicle, etc. However, the crossing moving object does not always go in a fixed direction, but may move in a staggering or fluctuating manner, as shown in FIG. 2. Thus, in cases where the crossing moving object A is going in the staggering or fluctuating manner, the actual direction of the moving vector of the crossing moving object A changes frequently, as shown by broken line arrows in FIG. 2. It is difficult to predict the collision position of the crossing moving object A and the subject vehicle 100 with a high degree of accuracy based on the moving vector of which the direction changes in a frequent manner.

Accordingly, in this embodiment, the direction of the moving vector of the crossing moving object A used for the prediction of the collision position of the crossing moving object A and the subject vehicle 100 is set based on the shape of a road to which the subject vehicle 100 has turned right (or the shape of a road to which the subject vehicle has turned left in cases where the subject vehicle has turned to the left). More specifically, as shown by solid line arrows in FIG. 2, the direction of the moving vector of the crossing moving object A is set to a direction vertical with respect to the road into which the subject vehicle 100 has entered, i.e., the road on which the crossing moving object A is moving (hereinafter this direction may be referred to as a road vertical direction).

Figure 3:
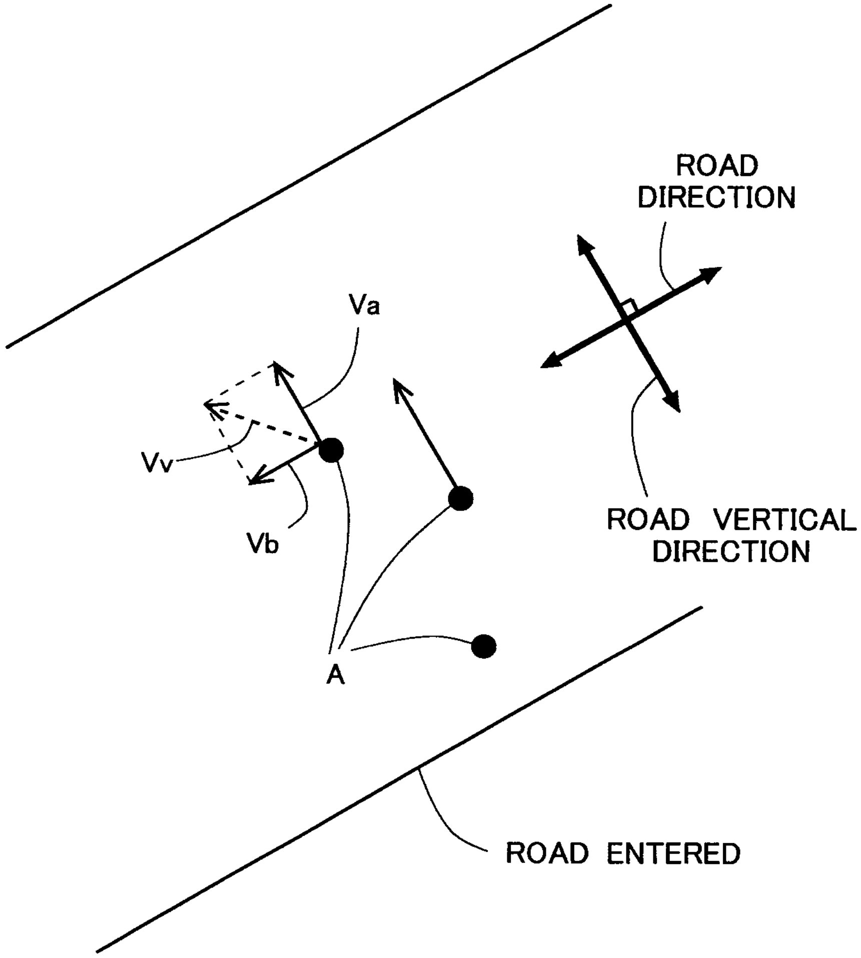
FIG. 3 This is a view showing a calculation method for a moving vector of the crossing moving object which is used for prediction of the position of a collision according to the first embodiment.

FIG. 3 is a view showing a calculation method for the moving vector of the crossing moving object A used for the prediction of the collision position according to this embodiment. As shown in FIG. 3, in this embodiment, a moving vector Vv is first calculated by connecting between the current position and the last position of the crossing moving object A inputted from the target object relative position calculation part 31 of the radar ECU 3 (hereinafter, the moving vector calculated based on the position information in this manner may be referred to as a temporary moving vector). Subsequently, the temporary moving vector Vv thus calculated is decomposed or divided into a road vertical direction component Va and a road direction component Vb. Then, the road vertical direction component Va is set as the moving vector of the crossing moving object A used for collision position prediction.

Even if the crossing moving object is moving in a staggering manner, there is a very high possibility that the crossing moving object is basically going in the road vertical direction. In addition, by calculating the moving vector of the crossing moving object in the manner as mentioned above, the direction of the moving vector can be fixed to the road vertical direction. Accordingly, by predicting the collision position of the crossing moving object and the subject vehicle based on the moving vector calculated in this manner, it becomes possible to predict that collision position with a high degree of accuracy.

(Collision Position Predicting Flow)

Figure 4:
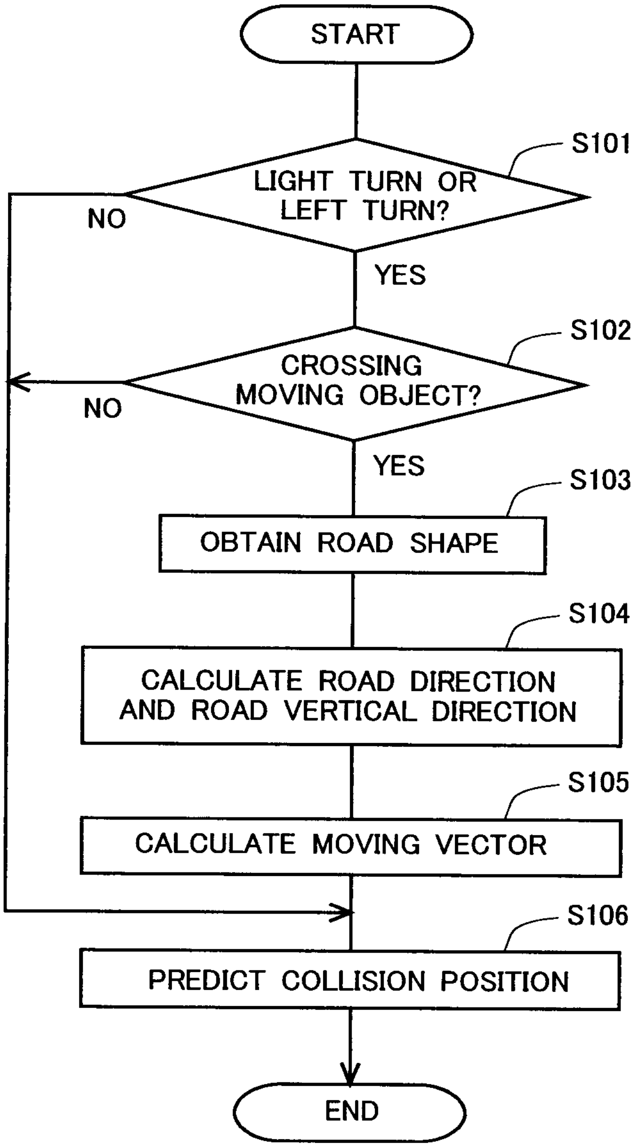
FIG. 4 This is a flow chart showing a collision position predicting flow according to the first embodiment.

A collision position predicting flow according to this embodiment will be described based on a flow chart shown in FIG. 4. This flow is stored in advance in the system ECU 8, and is carried out by the system ECU 8 at a predetermined interval in a repeated manner.

In this flow, first in step S101, it is determined whether the subject vehicle is in a right turn state or in a left turn state. In this embodiment, such a determination is carried out based on at least one of the detected values of the steering angle sensor 4 and the yaw rate sensor 5. Here, note that in cases where the collision position predicting system 1 is provided with an image sensor which serves to pick up an image ahead of the subject vehicle, the above determination can also be carried out based on the image picked up by the image sensor. Moreover, the above determination can also be carried out based on the state of a vehicle mounted switch, such as a winker (directional indicator), etc., which is turned on at the time of right turn or left turn, or based on the travel lane of the subject vehicle, etc., detected by the image sensor or the navigation system 7.

In this embodiment, when the subject vehicle is in the right turn state, the value of a right/left turn state flag is set to “1”, and when the subject vehicle is in the left turn state, the value of the right/left turn state flag is set to “2”, and when the subject vehicle is in a straight travel state, the value of the right/left turn state flag is set to “0”. In step S101, when the value of the right/left turn state flag is “1” or “2”, an affirmative determination is made, and the processing of step S102 is then carried out. On the other hand, when the value of the right/left turn state flag is “0”, a negative determination is made, and the processing of step S106 is then carried out.

In step S102, it is determined whether a target object detected by the millimeter wave radar 2 is a crossing moving object. Such a determination is made based on the calculation results in the target object relative position calculation part 31 and the target object relative speed calculation part 32 of the radar ECU 3, for example. In addition, a determination as to whether the target object is a pedestrian or a bicycle may be made based on the strength of reception waves received by the millimeter wave radar 2. In this case, when a determination is made that the target object is a pedestrian or a bicycle, it is decided that the target object is a crossing moving object.

In this embodiment, when the target object is a crossing moving object, the value of a crossing moving object flag is set to “1”, whereas when the target object is not a crossing moving object, the value of the crossing moving object flag is set to “0”. In step S102, when the value of the crossing moving object flag is “1”, an affirmative determination is made, and the processing of step S103 is then carried out. On the other hand, when the value of the crossing moving object flag is “0”, a negative determination is made, and the processing of step S106 is then carried out.

In step S106 after a negative determination is made in the above-mentioned step S101 or S102, the collision position of the target object and the subject vehicle detected by the millimeter wave radar 2 is predicted according to a conventional method. In other words, the collision position is predicted based on a moving vector which is calculated based on the position information on the target object.

In step 103, the shape of a road to which the subject vehicle has turned right or left is obtained based on the current position of the subject vehicle calculated by the navigation system 7 and its road or route information. Here, note that in cases where the collision position predicting system 1 is provided with an image sensor which serves to pick up an image ahead of the subject vehicle, the shape of the road may also be obtained from the image picked up by the image sensor. In addition, the shape of the road may also be obtained based on a signal inputted from the millimeter wave radar 2. Moreover, a communication medium may be arranged on the road or in a structure in the surroundings of the road, so that the shape of the road may also be obtained based on information received from the communication medium.

Then, in step S104, the road direction and the road vertical direction with respect to the road into which the subject vehicle has turned to the right or of the left to enter are calculated based on the shape of the road obtained in step 103.

Subsequently, in step S105, the moving vector of the crossing moving object to be used for the prediction of the collision position is calculated. In other words, the temporary moving vector of the crossing moving object is calculated, and then it is further decomposed into individual components in the road direction and in the road vertical direction, respectively, which have been calculated in step S104. Then, the road vertical direction component of the temporary moving vector is calculated as the moving vector of the crossing moving object used for the prediction of the collision position.

Thereafter, in step S106, the collision position of the crossing moving object and the subject vehicle is predicted based on the moving vector of the crossing moving object calculated in step S105, the speed of the subject vehicle, etc.

Here, note that in the system ECU 8, the processing of the above-mentioned step 101 is carried out by the right and left turn determination calculation part 81, and the processing of the above-mentioned step S102 is carried out by the crossing moving object determination calculation part 82. In addition, the processing of the above-mentioned step S103 is carried out by the road shape obtaining part 83, and the processing of the above-mentioned step S104 is carried out by the road direction and road vertical direction calculation part 84. Moreover, the processing of step S105 is carried out by the moving vector calculation part 85, and the processing of step S106 is carried out by the collision position calculation part 86.

Then, based on whether the collision position of the crossing moving object and the subject vehicle predicted according to the above-mentioned flow satisfies a predetermined condition, it is determined whether the crossing moving object and the subject vehicle may collide with each other. Here, the predetermined condition is, for example, that the collision position thus predicted exists on the road on which the subject vehicle is travelling. This determination is carried out by the collision determination calculation part 87.

Here, note that in this embodiment, the millimeter wave radar 2 corresponds to moving object detection unit according to the present invention. In place of the millimeter wave radar 2, or in addition to the millimeter wave radar 2, it is also possible to use, as the moving object detection unit according to the present invention, another sensor, such as an image sensor, etc., which can detect the target object. In addition, in this embodiment, the collision position calculation part 86 of the system ECU 8 corresponds to collision position predicting unit according to the present invention.

<Second Embodiment>

Reference will be made to a second embodiment of a collision position predicting device according to the present invention, based on FIGS. 5 through 7. Here, note that only those which are different from the first embodiment will be explained.

(Schematic Construction)

Figure 5:
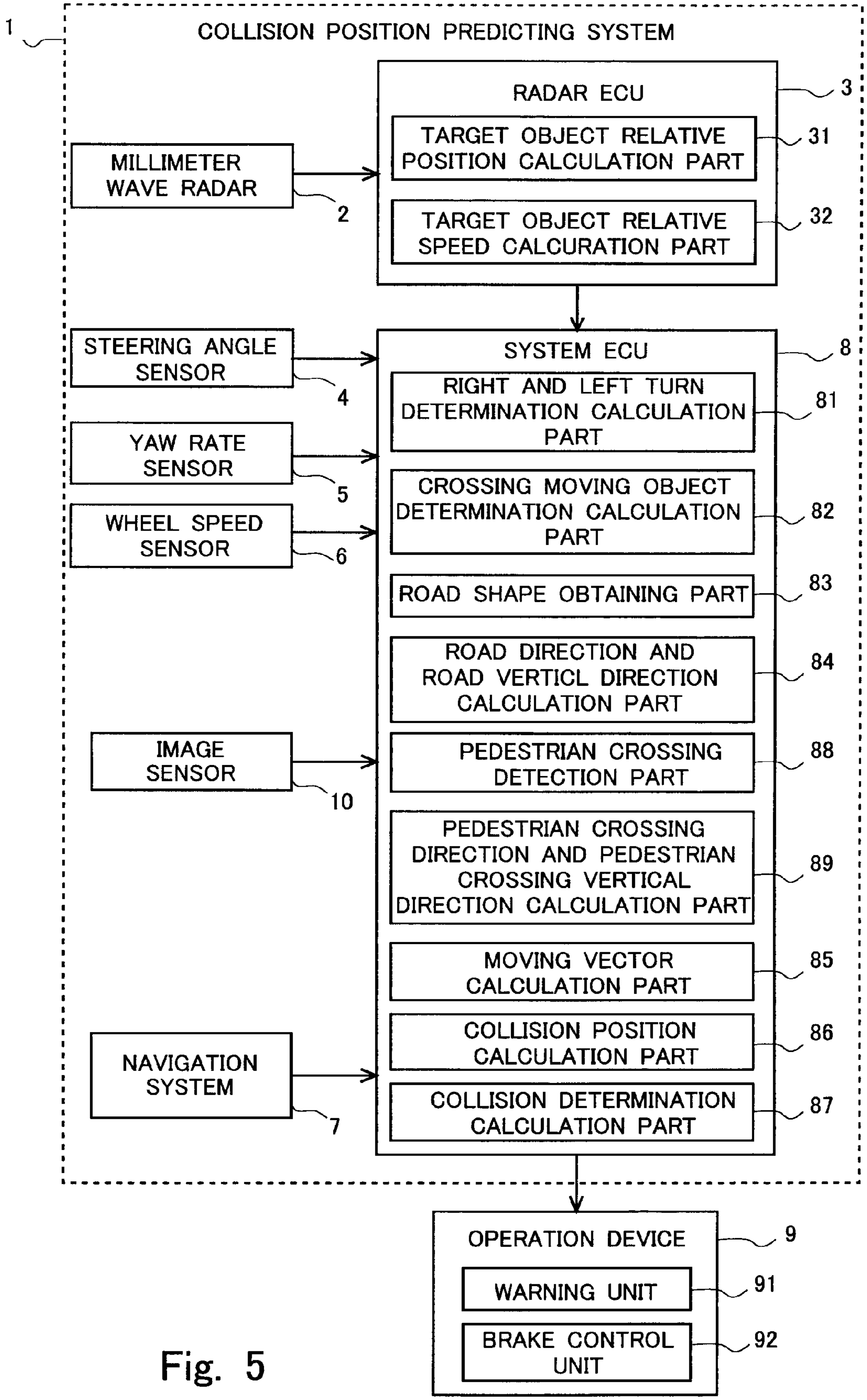
FIG. 5 This is a block diagram showing the overall construction of a collision position predicting system according to a second embodiment of the present invention.

FIG. 5 is a block diagram showing the overall construction of a collision position predicting system according to this second embodiment of the present invention. The collision position predicting system 1 according to this embodiment is provided with an image sensor 10. The image sensor 10 is arranged at the front side of the subject vehicle, and is a sensor which picks up an image ahead of the subject vehicle. In addition, the image sensor 10 outputs the picked-up image to a system ECU 8.

Here, note that in this embodiment, a target object existing ahead of the subject vehicle may be detected based on the result of detection by the millimeter wave radar 2 and the image picked up by the image sensor 10.

In addition, the system ECU 8 according to this embodiment is provided with a pedestrian crossing detection part 88, and a pedestrian crossing direction and pedestrian crossing vertical direction calculation part 89. The details of each part will be described later.

(Collision Position Predicting Method)

A pedestrian crossing may be formed or arranged on a road into which the subject vehicle has turned to the right or to the left to enter. Here, in this embodiment, based on FIG. 6, description will be given to a method for predicting the position of a collision between a crossing moving object and a subject vehicle, wherein a pedestrian crossing is formed or arranged on a road into which the subject vehicle has turned to the right or to the left to enter, and the crossing moving object detected by the millimeter wave radar 2 exists on the pedestrian crossing.

In cases where the crossing moving object exists on the pedestrian crossing, even if the crossing moving object is going in a staggering manner, there is a very high possibility that the crossing moving object is going along the direction of the pedestrian crossing, irrespective of the shape of the road. Accordingly, in such a case, in this embodiment, the direction of the moving vector of the crossing moving object used for the prediction of the position of a collision between the crossing moving object and the subject vehicle is set to the direction of the pedestrian crossing in preference to the shape of the road.

Figure 6:
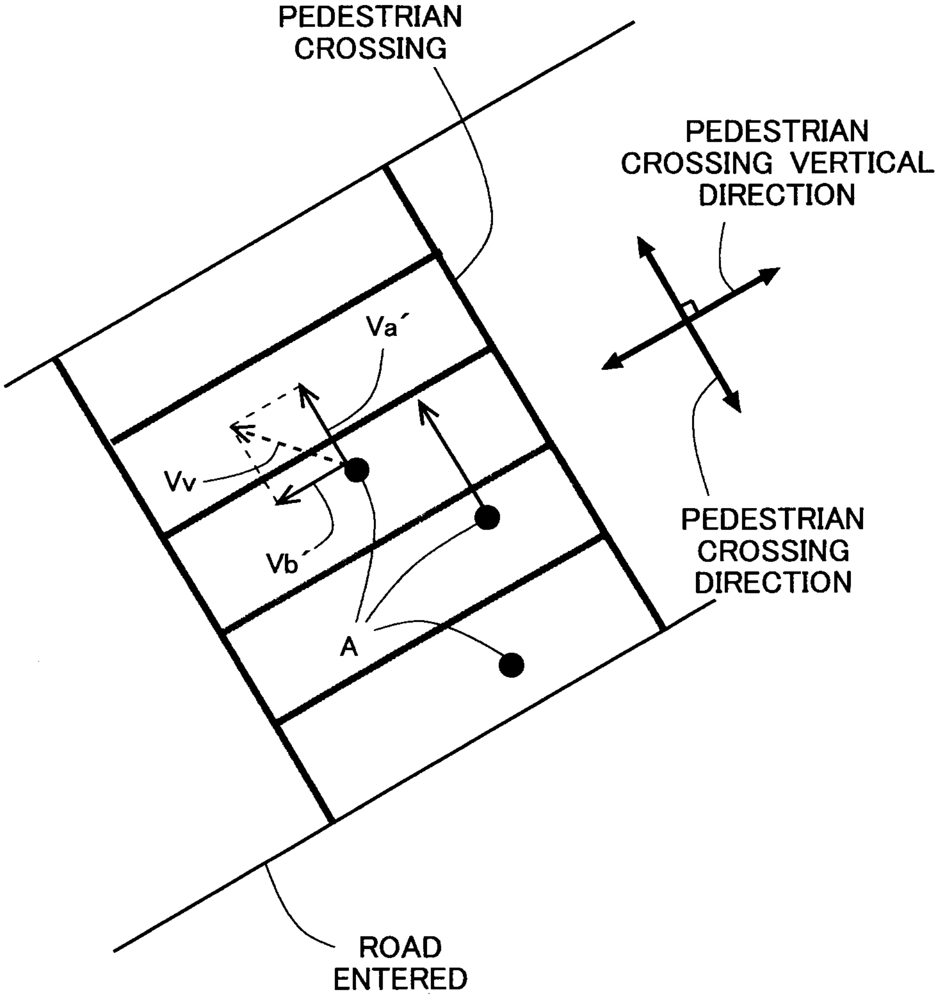
FIG. 6 This is a view showing a calculation method for a moving vector of a crossing moving object which is used for prediction of the position of a collision according to the second embodiment.
Figure 7:
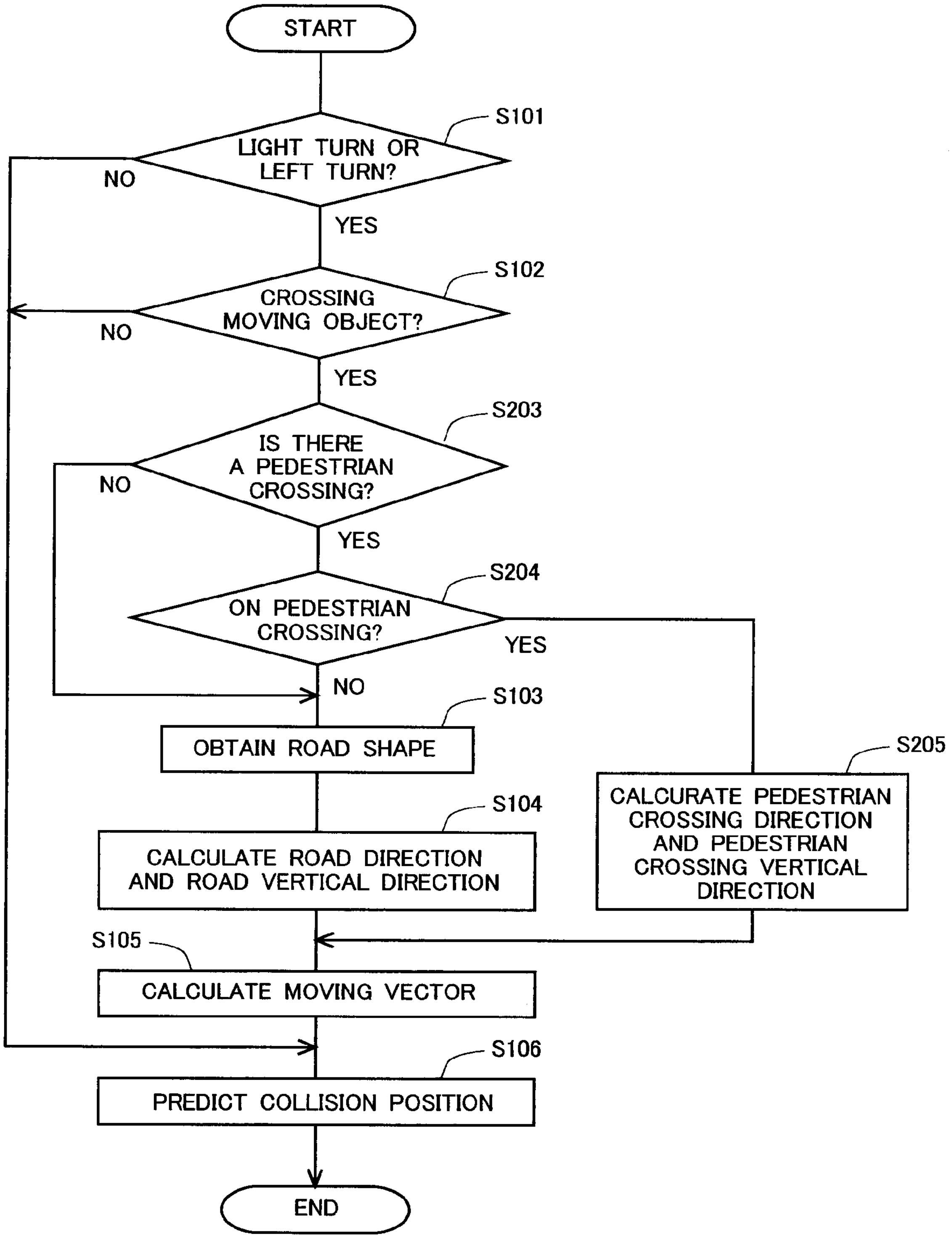
FIG. 7 This is a flow chart showing a collision position predicting flow according to the second embodiment.
Figure 8:
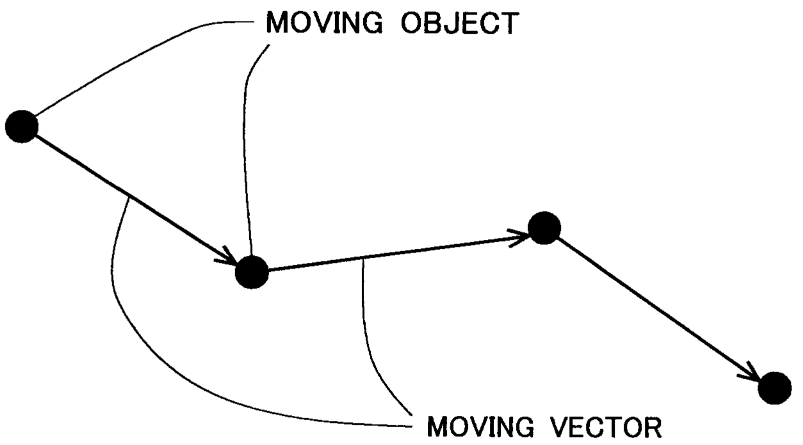
FIG. 8 This is a view showing moving vectors of a moving object calculated based on a plurality of pieces of position information which have been detected at a predetermined interval of time.
Figure 9:
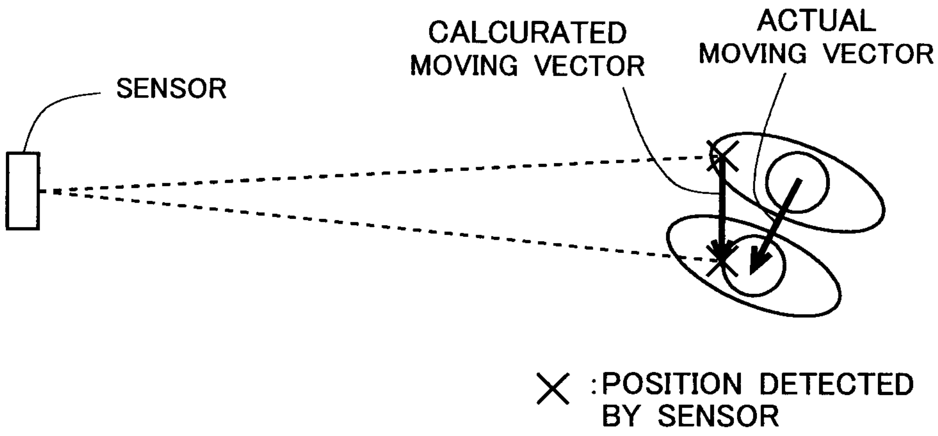
FIG. 9 This is a view showing a moving vector of a pedestrian calculated based on the position information detected by a sensor.

FIG. 6 is a view showing a calculation method for the moving vector of a crossing moving object A used for the prediction of the collision position according to this embodiment. As shown in FIG. 6, in this embodiment, too, similar to the case of the first embodiment, a temporary moving vector Vv is first calculated by connecting between the current position and the last position of the crossing moving object A inputted from the target object relative position calculation part 31 of the radar ECU 3. Subsequently, the temporary moving vector Vv thus calculated is decomposed or divided into a pedestrian crossing direction component Va' and a pedestrian crossing vertical direction component Vb'. Then, the pedestrian crossing direction component Va' is set as the moving vector of the crossing moving object A to be used for collision position prediction.

By calculating the moving vector of the crossing moving object in this manner, the direction of the moving vector can be fixed to the pedestrian crossing direction which is a basic direction of movement of the crossing moving object. Accordingly, by predicting the collision position of the crossing moving object and the subject vehicle based on the moving vector calculated in this manner, it becomes possible to predict that collision position with a high degree of accuracy.

(Collision Position Predicting Flow)

A collision position predicting flow according to this embodiment will be described based on a flow chart shown in FIG. 7. This flow is stored in advance in the system ECU 8, and is carried out by the system ECU 8 at a predetermined interval in a repeated manner. Here, note that this flow is one in which, steps S203 through S205 are added to the flow shown in FIG. 4. For that reason, only those which are different from the flow shown in FIG. 4 will be described, and for those steps in which the same processing is carried out, the same reference numerals and characters are attached and an explanation thereof is omitted.

In this embodiment, in cases where a determination is made in step S102 that a target object detected by the millimeter wave radar 2 is a crossing moving object, the processing of step S203 is then carried out. In step S203, it is determined, based on the image picked up by the image sensor 10, whether there is a pedestrian crossing formed on the road into which the subject vehicle has entered.

In this embodiment, in cases where a pedestrian crossing is detected by the pedestrian crossing detection part 88 from the image of the road into which the subject vehicle has entered and which has been picked up by the image sensor 10, the value of a pedestrian crossing flag is set to "1", whereas in cases where a pedestrian crossing is not detected from the image, the value of the pedestrian crossing flag is set to "0". In step S203, when the value of the pedestrian crossing flag is "1", an affirmative determination is made, and the processing of step S204 is then carried out. On the other hand, when the value of the pedestrian crossing flag is "0", a negative determination is made, and the processing of step S103 is then carried out.

In step S204, it is determined whether a crossing moving object exists on the pedestrian crossing. When a crossing moving object exists on the pedestrian crossing, the value of a moving object position flag is set to "1", whereas when a crossing moving object does not exist on the pedestrian crossing, the value of the moving object position flag is set to "0". In step S204, when the value of the moving object position flag is "1", an affirmative determination is made, and the processing of step S205 is then carried out. On the other hand, when the value of the moving object position flag is "0", a negative determination is made, and the processing of step S103 is then carried out.

In step S205, the pedestrian crossing direction and the pedestrian crossing vertical direction of the pedestrian crossing on which the crossing moving object exists are calculated based on the image picked up by the image sensor 10. Here, note that in the system ECU 8, the processing of the step S205 is carried out by the pedestrian crossing direction and pedestrian crossing vertical direction calculation part 89.

Subsequently, in step S105, the moving vector of the crossing moving object to be used for the prediction of the collision position is calculated. In this case, in step S105, the temporary moving vector of the crossing moving object is calculated, and then it is further decomposed into individual components in the pedestrian crossing direction and in the pedestrian crossing vertical direction, respectively, which have been calculated in step S205. Then, the pedestrian crossing direction component of the temporary moving vector is calculated as the moving vector of the crossing moving object to be used for the prediction of the collision position.

DESCRIPTION OF THE REFERENCE SIGNS

1 . . . collision position predicting system
2 . . . millimeter wave radar
3 . . . radar ECU
4 . . . steering angle sensor
5 . . . yaw rate sensor
6 . . . wheel speed sensor
7 . . . navigation system
8 . . . system ECU
10 . . . image sensor
31 . . . target object relative position calculation part
32 . . . target object relative speed calculation part
81 . . . right and left turn determination calculation part
82 . . . crossing moving object determination calculation part
83 . . . road shape obtaining part
84 . . . road direction and road vertical direction calculation part
85 . . . moving vector calculation part
86 . . . collision position calculation part
87 . . . collision determination calculation part
88 . . . pedestrian crossing detection part
89 . . . pedestrian crossing direction and pedestrian crossing vertical direction calculation part

The invention claimed is:

1. A collision position predicting device comprising:

moving object detection unit to detect a moving object on a road; and collision position predicting unit to predict, upon detection of a moving object crossing the road by the moving object detection unit, the collision position of the moving object and the subject vehicle based on a moving vector of the moving object, wherein in cases where the moving object crossing the road into which the subject vehicle has entered is detected at the time when the subject vehicle has turned to the right or to the left, a moving vector calculated from position information on said moving object is decomposed into a road direction component in the direction of the road into which the subject vehicle has entered and a vertical direction component which is vertical to said road, and said vertical direction component is used as the moving vector of said moving object which is used for the prediction of the collision position by said collision position predicting unit, and wherein in cases where a pedestrian crossing is formed on the road into which the subject vehicle has turned to the right or to the left to enter and the moving object crossing the road detected by said moving object detection unit exists on said pedestrian crossing, a moving vector calculated from position information on said moving object is decomposed into a pedestrian crossing direction component and a vertical direction component which is vertical to said pedestrian crossing, and said pedestrian crossing direction component is used as the moving vector of said moving object which is used for the prediction of the collision position by said collision position predicting unit in preference to the vertical direction component with respect to said road into which the subject vehicle has entered.

2. The collision position predicting device as set forth claim 1, further comprising:

obtaining unit to obtain the shape of a road into which the subject vehicle has entered at the time when the subject vehicle has turned to the right or to the left; and calculating unit to calculate the direction vertical to the road into which the subject vehicle has entered based on the shape of the road obtained by said obtaining unit.

* * * * *